US012780118B1

(12) United States Patent
Schubart et al.

(10) Patent No.: US 12,780,118 B1
(45) Date of Patent: Nov. 3, 2026

(54) ELECTRIC VEHICLE WITH MODULAR HEADLINER

(71) Applicant: Oshkosh Defense, LLC, Oshkosh, WI (US)

(72) Inventors: Kai P. Schubart, Oshkosh, WI (US); Mitchell Wolfrath, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 337 days.

(21) Appl. No.: 18/663,890

(22) Filed: May 14, 2024

Related U.S. Application Data

(60) Provisional application No. 63/466,657, filed on May 15, 2023.

(51) Int. Cl.

| | |
|---|---|
| ***B62D 65/14*** | (2006.01) |
| ***B60H 1/00*** | (2006.01) |
| ***B60R 13/02*** | (2006.01) |
| ***B60R 16/02*** | (2006.01) |
| *B60J 3/02* | (2006.01) |

(52) U.S. Cl.

CPC ..... *B60R 13/0225* (2013.01); *B60H 1/00507* (2013.01); *B60R 13/0206* (2013.01); *B60R 16/0215* (2013.01); *B62D 65/14* (2013.01); *B60J 3/0204* (2013.01)

(58) Field of Classification Search

CPC ............ B60R 13/0225; B60R 13/0206; B60R 16/0215; B60H 1/00507; B62D 65/14; B60J 3/0204

See application file for complete search history.

(56) References Cited

U.S. PATENT DOCUMENTS

| | | | | |
|---|---|---|---|---|
| 4,893,867 A * | 1/1990 | Hilborn | B60R 13/0225 | 296/214 |
| 6,073,987 A * | 6/2000 | Lindberg | B62D 25/142 | 296/70 |
| 6,824,185 B2 * | 11/2004 | Tiesler | B60R 11/02 | 296/214 |
| 6,896,321 B2 * | 5/2005 | Vishey | B32B 5/28 | 296/214 |
| 7,055,882 B2 * | 6/2006 | Santaolalla Gil | B60R 7/04 | 296/210 |
| 2004/0169390 A1 * | 9/2004 | Tiesler | B60R 11/02 | 296/37.8 |

(Continued)

FOREIGN PATENT DOCUMENTS

DE 102016212512 A1 * 1/2018 ......... B60R 13/0212

*Primary Examiner* — Aaron L Lembo

(74) *Attorney, Agent, or Firm* — Foley & Lardner LLP

(57) ABSTRACT

An electric delivery vehicle including a cab and a modular headliner. The cab defines a driver compartment. The modular headliner is configured to be disposed in the driver compartment to house an electrical component of the electric delivery vehicle. The modular headliner includes a hook configured to couple the modular headliner with the cab, a compartment configured to receive the electrical component, and a wiring system configured to electrically couple the electrical component with other components of the electric delivery vehicle. The modular headliner is a self-contained assembly, and the electrical component is configured to be assembled on the modular headliner without the modular headliner coupled with the cab by the hook.

20 Claims, 14 Drawing Sheets

(56) References Cited

U.S. PATENT DOCUMENTS

| | | | | |
|---|---|---|---|---|
| 2005/0212319 | A1 * | 9/2005 | Gil | B60R 7/04<br>296/37.7 |
| 2006/0061145 | A1 * | 3/2006 | Strebe | B62D 65/06<br>296/214 |

* cited by examiner

ELECTRIC VEHICLE WITH MODULAR HEADLINER

CROSS-REFERENCE TO RELATED PATENT APPLICATION

This application claims the benefit of and priority to U.S. Provisional Patent Application No. 63/466,657, filed May 15, 2023, which is incorporated herein by reference in its entirety.

BACKGROUND

Delivery vehicles may have a number of doors, a cab, and a cargo portion. An operator may operate the vehicle from the cab. The cargo portion may serve as a storage area for parcels. The doors may provide entry and exit points for the operator to and from the cab and/or the cargo portion.

SUMMARY

One implementation of the present disclosure relates to an electric delivery vehicle, according to some embodiments. The electric delivery vehicle includes a cab and a modular headliner. The cab defines a driver compartment. The modular headliner is configured to be disposed in the driver compartment to house an electrical component of the electric delivery vehicle. The modular headliner includes a hook configured to couple the modular headliner with the cab, a compartment configured to receive the electrical component, and a wiring system configured to electrically couple the electrical component with other components of the electric delivery vehicle. The modular headliner is a self-contained assembly, and the electrical component is configured to be assembled on the modular headliner without the modular headliner coupled with the cab by the hook.

In some embodiments, the hook is configured to selectively couple the modular headliner with the cab. In some embodiments, the cab includes a roof including at least one engagement feature, and the hook is configured to engage with an engagement feature of the at least one engagement feature to selectively couple the modular headliner with the roof of the cab. In some embodiments the engagement feature is positioned such that the hook is configured to guide the modular headliner into proper positioning and alignment and support the modular headliner prior to the modular headliner being bolted in place. In some embodiments, the hook is disposed proximate a center of the modular headliner, the hook is configured to hold the modular headliner at a vertical position, and the at least one engagement feature provides adjustment of a horizontal position of the modular headliner.

In some embodiments, the modular headliner is a unitary injection molded structure.

In some embodiments, the modular headliner defines at least a portion of an HVAC system.

In some embodiments, the electrical component is at least one of a fan, camera, display, radio, speaker, transmitter, receiver, or microphone. In some embodiments the modular headliner includes a plurality of compartments configured to receive a plurality of electrical components and a terminal. In some embodiments, the wiring system is configured to electrically couple the plurality of electrical components with the terminal. In some embodiments, the terminal is configured to electrically couple the plurality of electrical components with the other components of the electric delivery vehicle. In some embodiments, the plurality of electrical components are configured to snap into the plurality of compartments of the modular headliner without requiring a fastener and without the modular headliner being installed in the electric delivery vehicle.

In some embodiments, the modular headliner includes a panel configured to cover at least a portion of the modular headliner such that the plurality of electrical components received within the plurality of compartments are disposed within the plurality of compartments. In some embodiments, the panel is configured to snap onto the modular headliner without requiring a fastener and without the modular headliner to be installed in the electric delivery vehicle.

In some embodiments, the modular headliner includes a visor movable between a stored position and a deployed position.

Another implementation of the present disclosure relates to a modular headliner for an electric delivery vehicle. The electric delivery vehicle includes an electrical component and a cab defining a driver compartment. The modular headliner includes a hook configured to selectively couple the modular headliner with the cab, a compartment configured to receive the electrical component, and a wiring system configured to electrically couple the electrical component with other components of the electric delivery vehicle. The cab includes a roof including at least one engagement feature, and the hook is configured to engage with an engagement feature of the at least one engagement feature to selectively couple the modular headliner with the roof of the cab within the driver compartment. The hook is configured to hold the modular headliner at a vertical position and facilitate lateral adjustment of the modular headliner within the driver compartment.

In some embodiments, the modular headliner further includes a plurality of compartments configured to receive a plurality of electrical components and a terminal. The wiring system is configured to electrically couple the plurality of electrical components with the terminal. The plurality of electrical components include at least one of a fan, camera, display, radio, speaker, transmitter, receiver, or microphone. In some embodiments, wherein the plurality of compartments are configured to receive the plurality of electrical components without requiring a fastener without the modular headliner being installed in the electric delivery vehicle. In some embodiments, the modular headliner further includes a panel configured to cover at least a portion of the modular headliner such that the plurality of electrical components received within the plurality of compartments are enclosed therein. In some embodiments, the panel is configured to snap onto the modular headliner without a fastener and without requiring the modular headliner to be installed in the electric delivery vehicle.

Another implementation of the present disclosure relates to a method of assembly. The method includes providing a vehicle and a modular headliner, the modular headliner including a hook, a compartment, and a wiring system, assembling, off of the vehicle, an electrical component of the vehicle on the modular headliner, installing, by the hook, the modular headliner assembled with the electrical component onto the vehicle, and electrically coupling, by the wiring system, the electrical component assembled on the modular headliner with other components of the vehicle. The compartment is configured to receive the electrical component of the vehicle when assembled on the modular headliner. The modular headliner, when installed onto the vehicle, is configured to be disposed in a driver compartment defined by a cab of the vehicle.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

According to the exemplary embodiment shown in FIGS. 1-7, a vehicle (e.g., a parcel vehicle, a cargo transport vehicle, a mail vehicle, a postal vehicle, a postal van, a truck, a van, etc.), shown as delivery vehicle 10, is configured to facilitate improved parcel delivery. Generally, the delivery vehicle 10 may be a specialized vehicle that transports parcels (e.g., mail, packages, etc.) from a distribution center (e.g., a post office, a warehouse, etc.) to various delivery locations (e.g., recipients' homes, offices, etc.).

Figure 1:
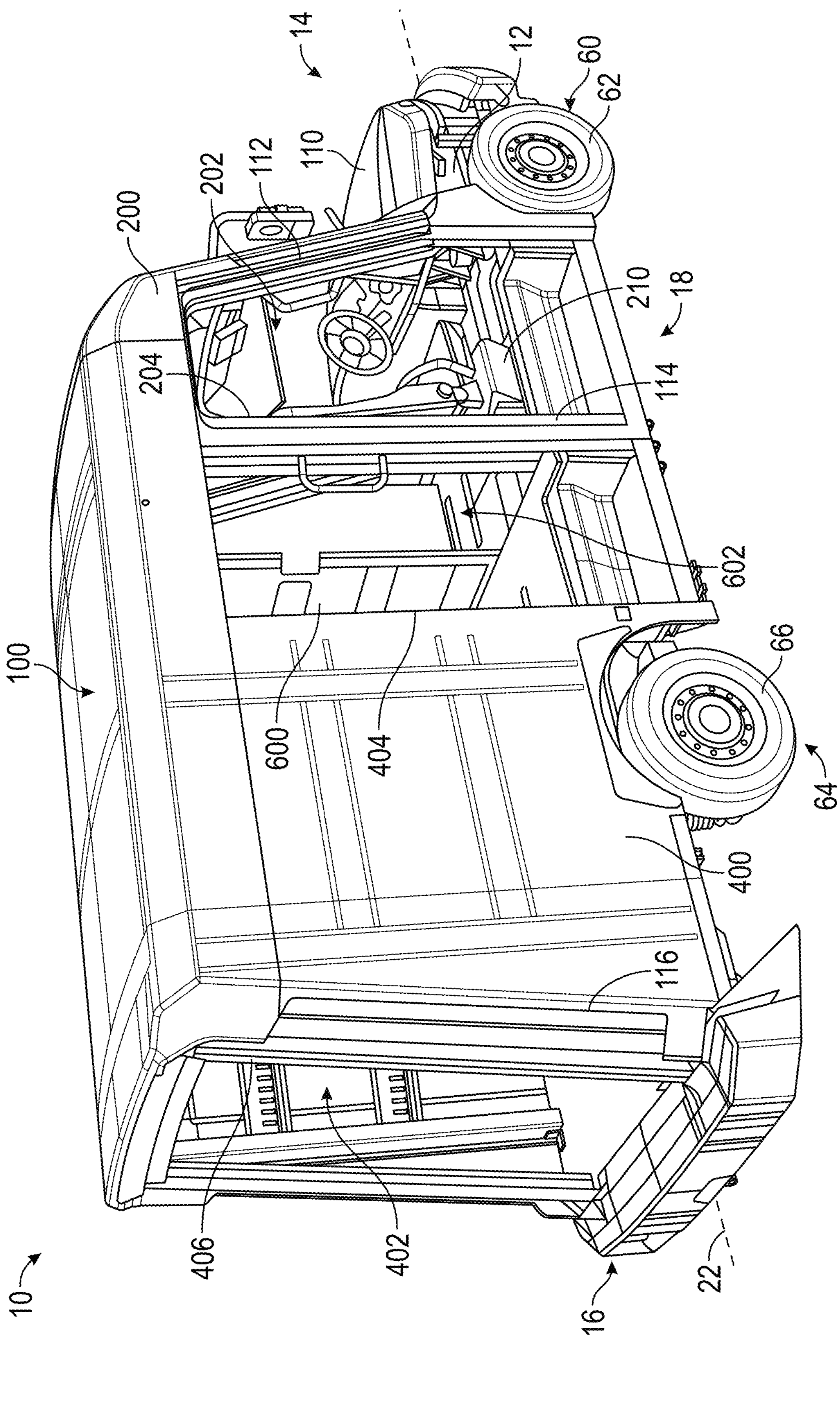
FIG. 1 is a rear perspective view of a delivery vehicle, according to an exemplary embodiment.
Figure 2:
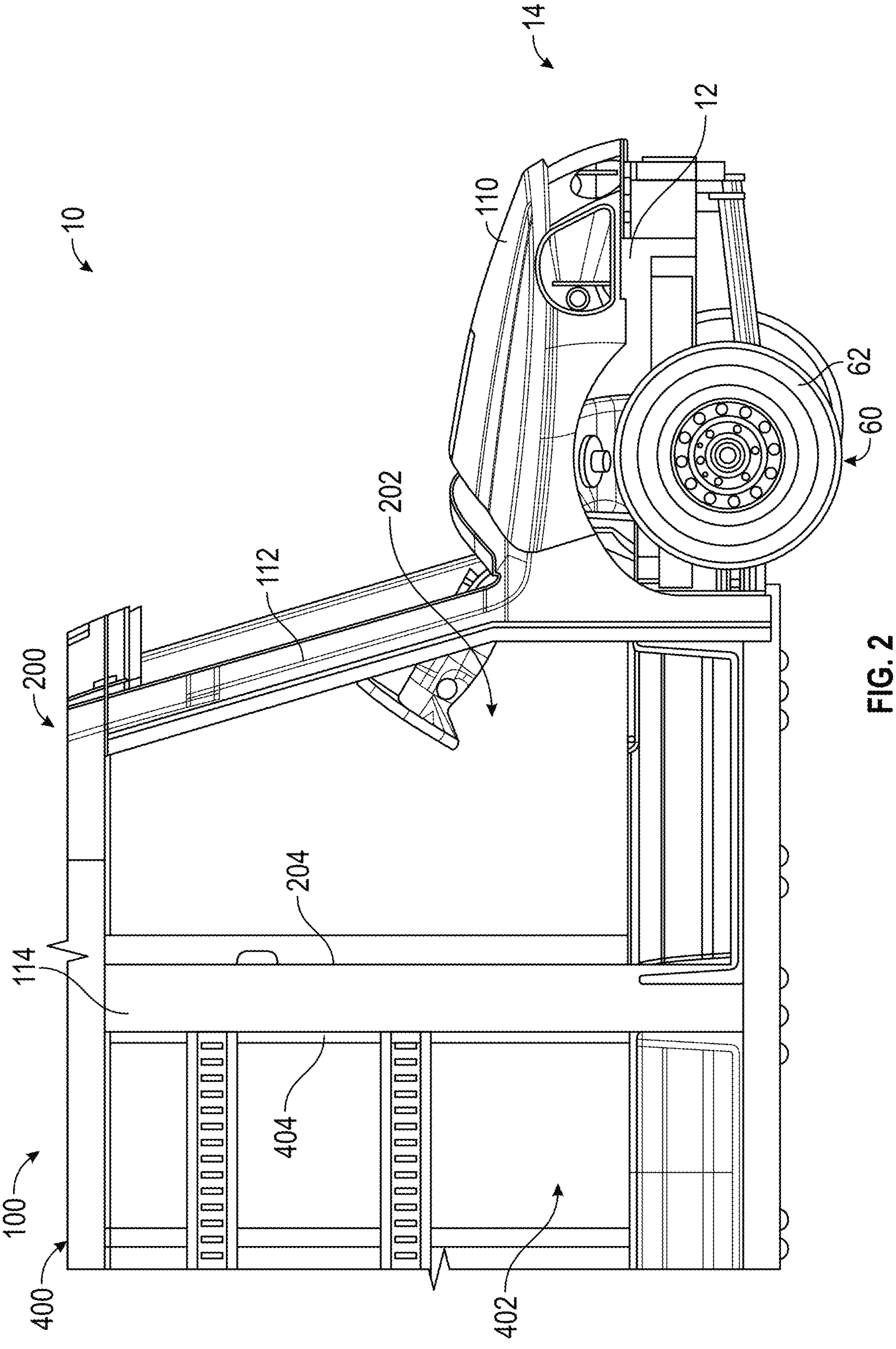
FIG. 2 is a partial side view of the delivery vehicle of FIG. 1, according to an exemplary embodiment.

As shown in FIGS. 1-7, the delivery vehicle 10 includes a chassis, shown as a frame 12. The frame 12 defines a first end, shown as front end 14, an opposing second end, shown as rear end 16, a first lateral side (e.g., a driver side, etc.), shown as right side 18, and an opposing second lateral side (e.g., a passenger side, etc.), shown as left side 20, of the delivery vehicle 10. While components of the delivery vehicle 10 may be described as being positioned along, proximate, adjacent, etc. the right side 18 or the left side 20 herein, it should be understood that such components could be positioned on the opposite side. As shown in FIG. 1, the frame 12 also defines a longitudinal axis, shown as central axis 22, extending longitudinally through the delivery vehicle 10 from the front end 14 to the rear end 16. As shown in FIG. 1-7, the frame 12 supports a first axle, shown as front axle 60, having a first plurality of tractive elements, shown as front wheels 62, coupled thereto; a second axle, shown as rear axle 64, having a second plurality of tractive elements, shown as rear wheels 66, coupled thereto; a power unit, shown as powertrain 70, that drives the front axle 60 and/or the rear axle 64 to move the delivery vehicle 10; and a body assembly, shown as body 100.

Figure 5:
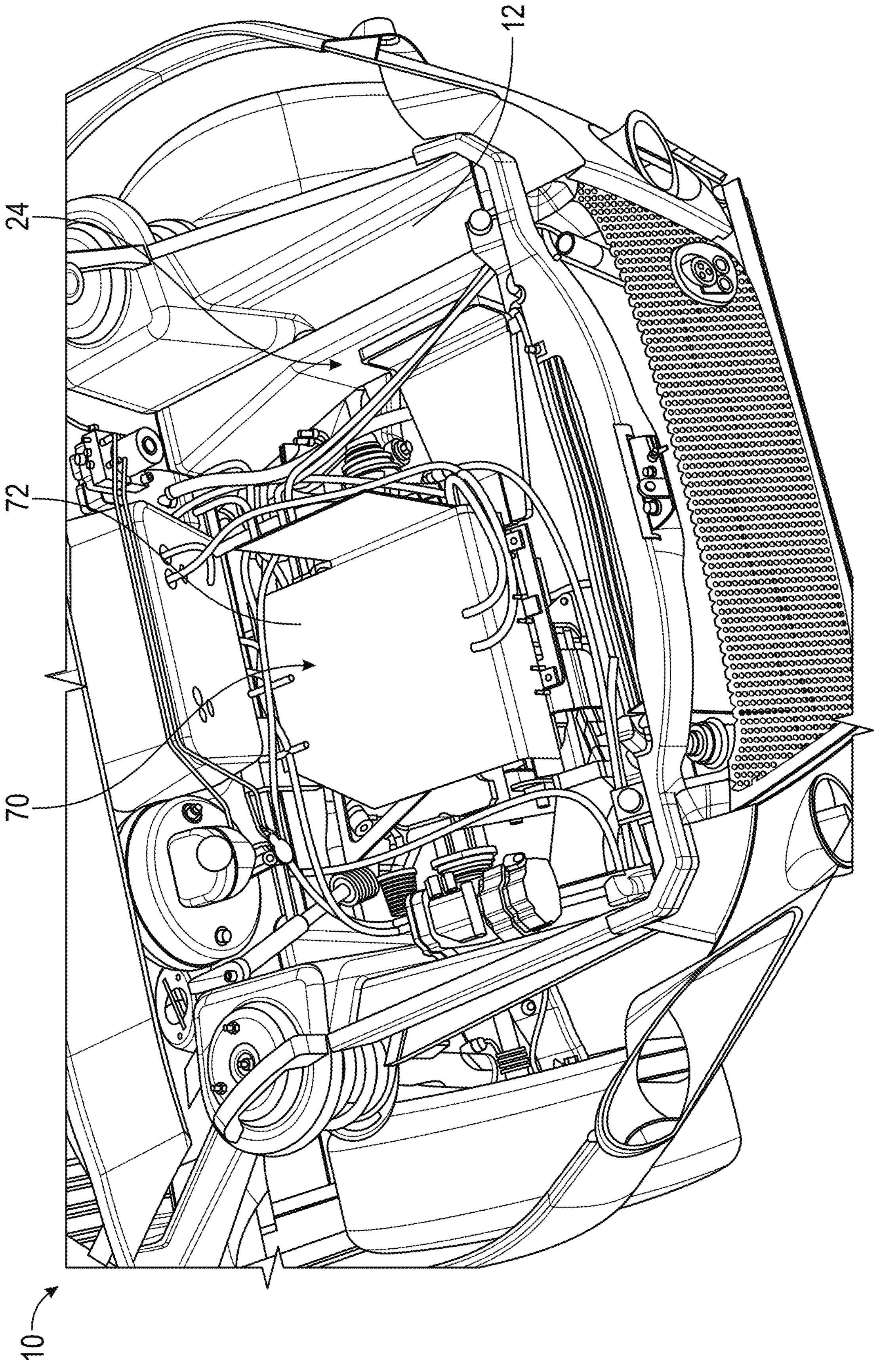
FIG. 5 is a detailed view of a primary driver compartment of the delivery vehicle of FIG. 1, according to an exemplary embodiment.
Figure 6:
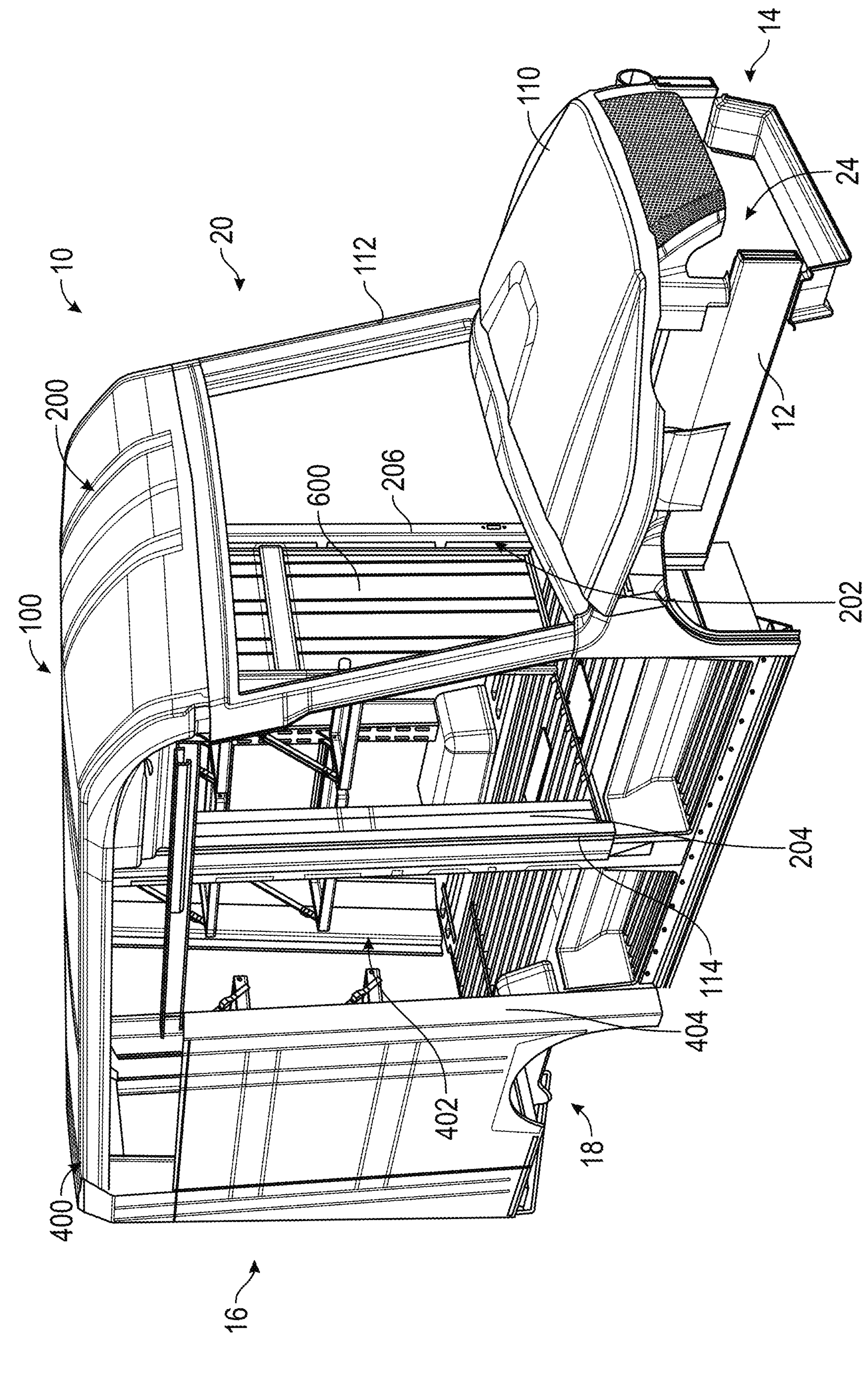
FIG. 6 is a right side perspective view of the delivery vehicle of FIG. 1 without a side door assembly, according to an exemplary embodiment.

As shown in FIG. 5, the powertrain 70 includes a primary driver or prime mover, shown as engine 72, coupled to and disposed within a primary driver compartment, shown as hood compartment 24, at the front end 14 of the frame 12. In some embodiments, the powertrain 70 is a traditional, internal combustion engine driven powertrain. In some embodiments, the powertrain 70 additionally includes on-board energy storage (e.g., a battery pack, etc.), a generator, and/or an electric motor to supplement the engine 72 such that the powertrain 70 is a hybrid powertrain. In some embodiments, the powertrain 70 does not include the engine 72. Rather, the primary driver may be an electric motor and the powertrain 70 may include on-board energy storage such that the powertrain 70 is an electric powertrain. In another embodiment, the primary diver includes a fuel cell and an electric motor such that the powertrain 70 is a fuel cell electric powertrain.

As shown in FIGS. 1-4, 6, and 7, the body 100 includes a hood, shown as hood 110, coupled to the front end 14 of the frame 12 and extending over the hood compartment 24 within which the engine 72 is positioned; a first pair of pillars, shown as A-pillars 112; a second pair of pillars, shown as B-pillars 114; a third pair of pillars, shown as C-pillars 116; a front cabin, shown as cab 200, positioned between the A-pillars 112 and the B-pillars 114; a rear storage section, shown as cargo body 400, positioned behind the cab 200 and between the B-pillars 114 and the C-pillars 116; a divider, shown as partition 600, extending between the B-pillars 114 and at least partially separating the cab 200 from the cargo body 400; and a door assembly, shown as side door assembly 700.

Figure 3:
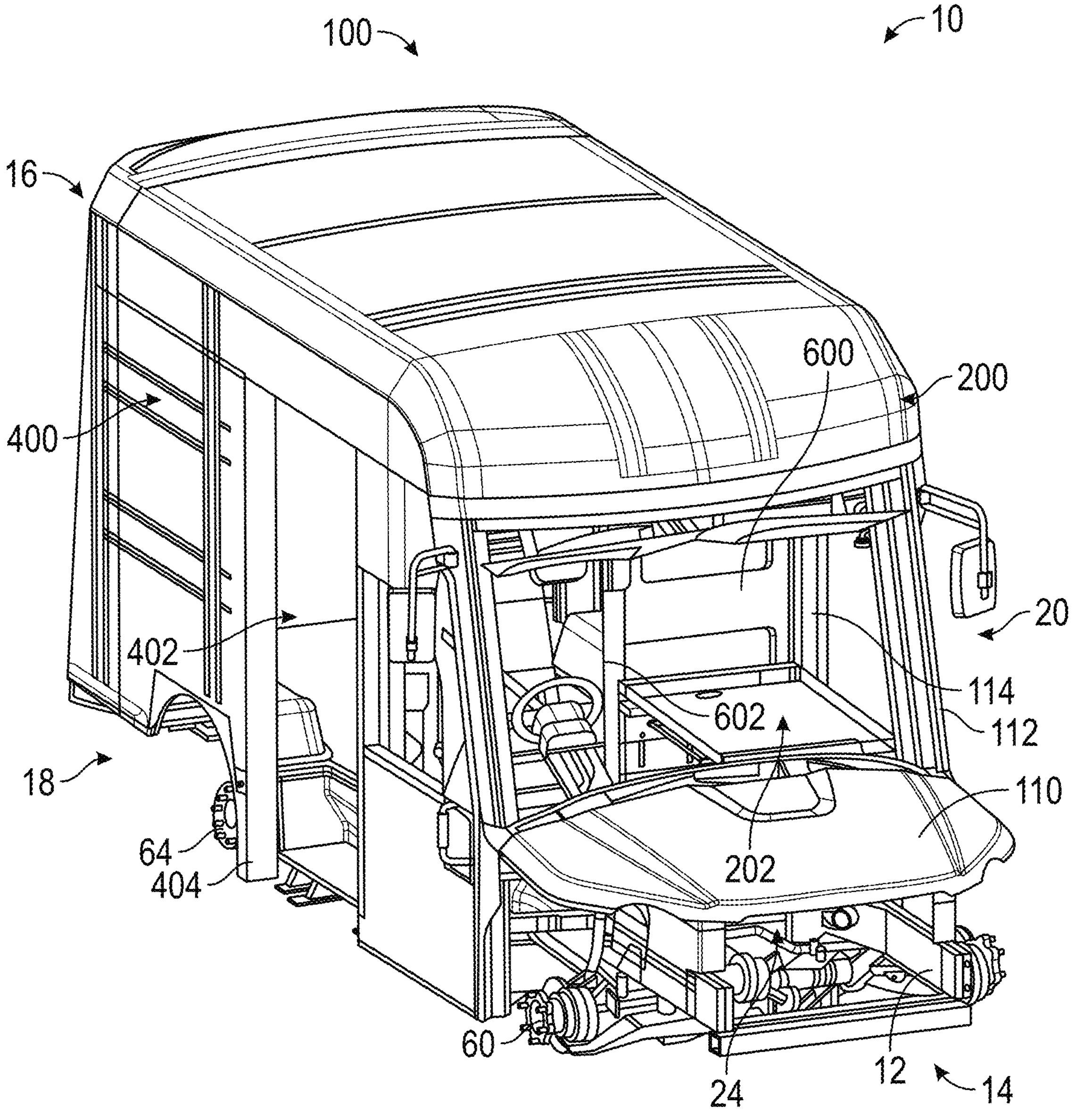
FIG. 3 is a front perspective view of the delivery vehicle of FIG. 1, according to an exemplary embodiment.
Figure 4:
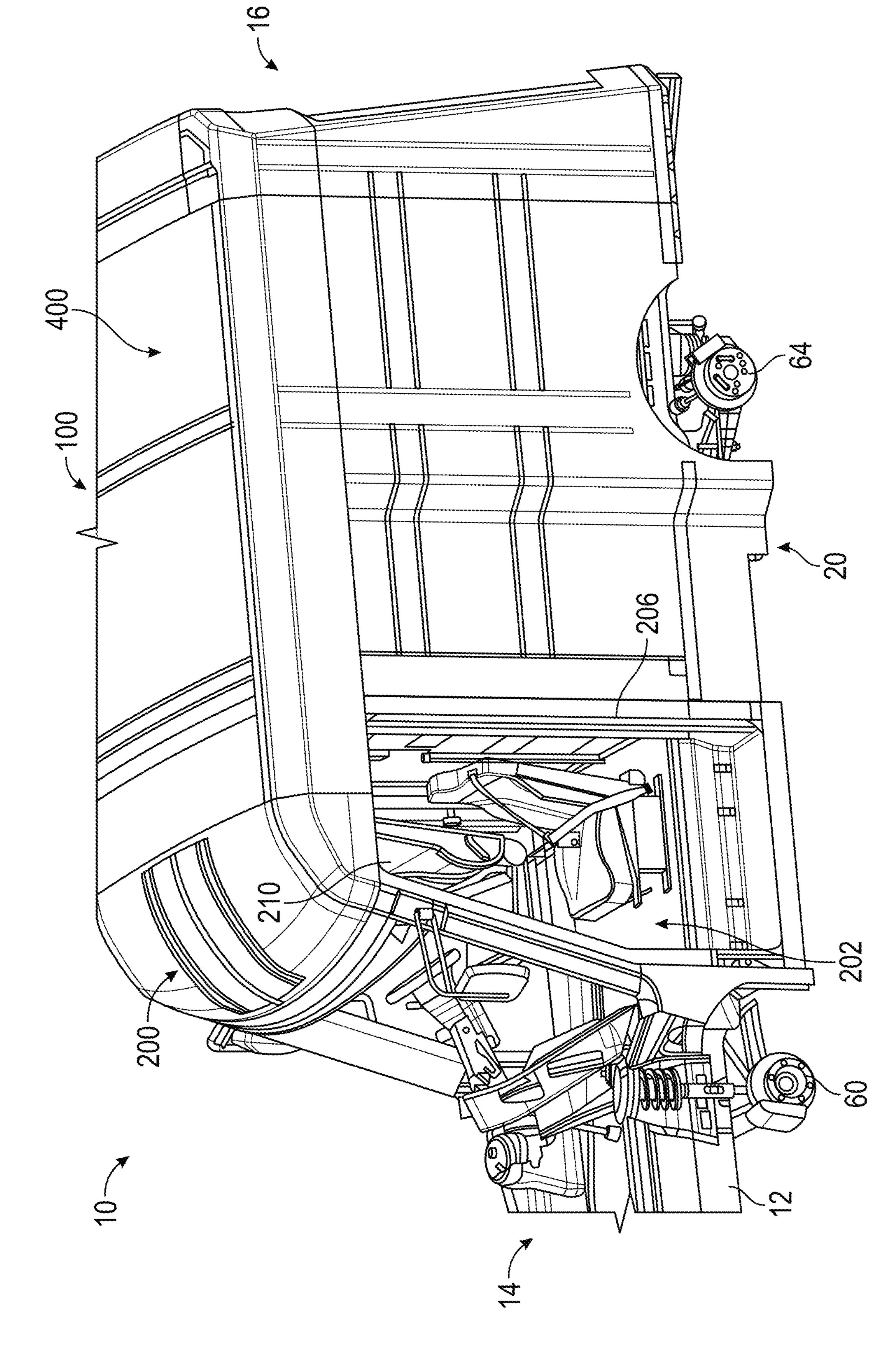
FIG. 4 is a left side perspective view of the delivery vehicle of FIG. 1, according to an exemplary embodiment.

As shown in FIGS. 1-4, 6, and 7, the cab 200 defines a first interior section or zone, shown as driver compartment 202, a first opening, shown as right cab opening 204, and a second opening, shown as left cab opening 206. The right cab opening 204 is positioned along the right side 18 of the delivery vehicle 10. The right cab opening 204 facilitates ingress into and egress from the driver compartment 202. The driver compartment 202 may be configured to contain or otherwise support a number of seats (e.g., one or more seats, etc.), storage units (e.g., a mail tray, etc.), and/or other equipment. As shown in FIGS. 1 and 4, the driver compartment 202 is configured to provide seating for an operator (e.g., a driver, etc.) of the delivery vehicle 10 with a seat, shown as driver seat 210. In some embodiments, the driver compartment 202 is configured to provide seating for a passenger of the delivery vehicle 10 (e.g., a temporary training seat, a repositionable passenger seat, etc.). The driver compartment 202 may also include various controls for driving the delivery vehicle 10 and/or operating the systems thereof (e.g., a user interface, a touchscreen, a display, a steering wheel, an accelerator pedal, a brake pedal, control levers, buttons, switches, etc.).

As shown in FIGS. 1-3 and 6, the cargo body 400 defines a second interior section or zone, shown as cargo compartment 402, a third opening, shown as side cargo opening 404, and a fourth opening, shown as rear cargo opening 406. The side cargo opening 404 is positioned along the right side 18 of the delivery vehicle 10 adjacent the right cab opening 204 with the right B-pillar 114 separating the two. The side cargo opening 404 facilitates ingress into and egress from the cargo compartment 402 from the right side 18 of the delivery vehicle 10. The rear cargo opening 406 is positioned at the rear end 16 of the delivery vehicle 10. The rear cargo opening 406 facilitates ingress into and egress from the cargo compartment 402 from the rear end 16 of the delivery vehicle 10. According to an exemplary embodiment, the cargo compartment 402 is configured to receive and store parcels (e.g., mail, packages, etc.) for transport and delivery via the delivery vehicle 10. In some embodiments, the cargo compartment 402 includes cabinets, shelves, racks, and/or other storage devices to facilitate organizing and securing the parcels within the cargo compartment 402.

As shown in FIGS. 1 and 3, the partition 600 is a partial partition that defines an opening, shown as passageway 602, that connects the driver compartment 202 to the cargo compartment 402. In some embodiments, the partition 600 includes a door or gate that at least partially and selectively encloses the passageway 602. In other embodiments, the partition 600 is a full partition that completely segregates the driver compartment 202 from the cargo compartment 402.

Figure 7:
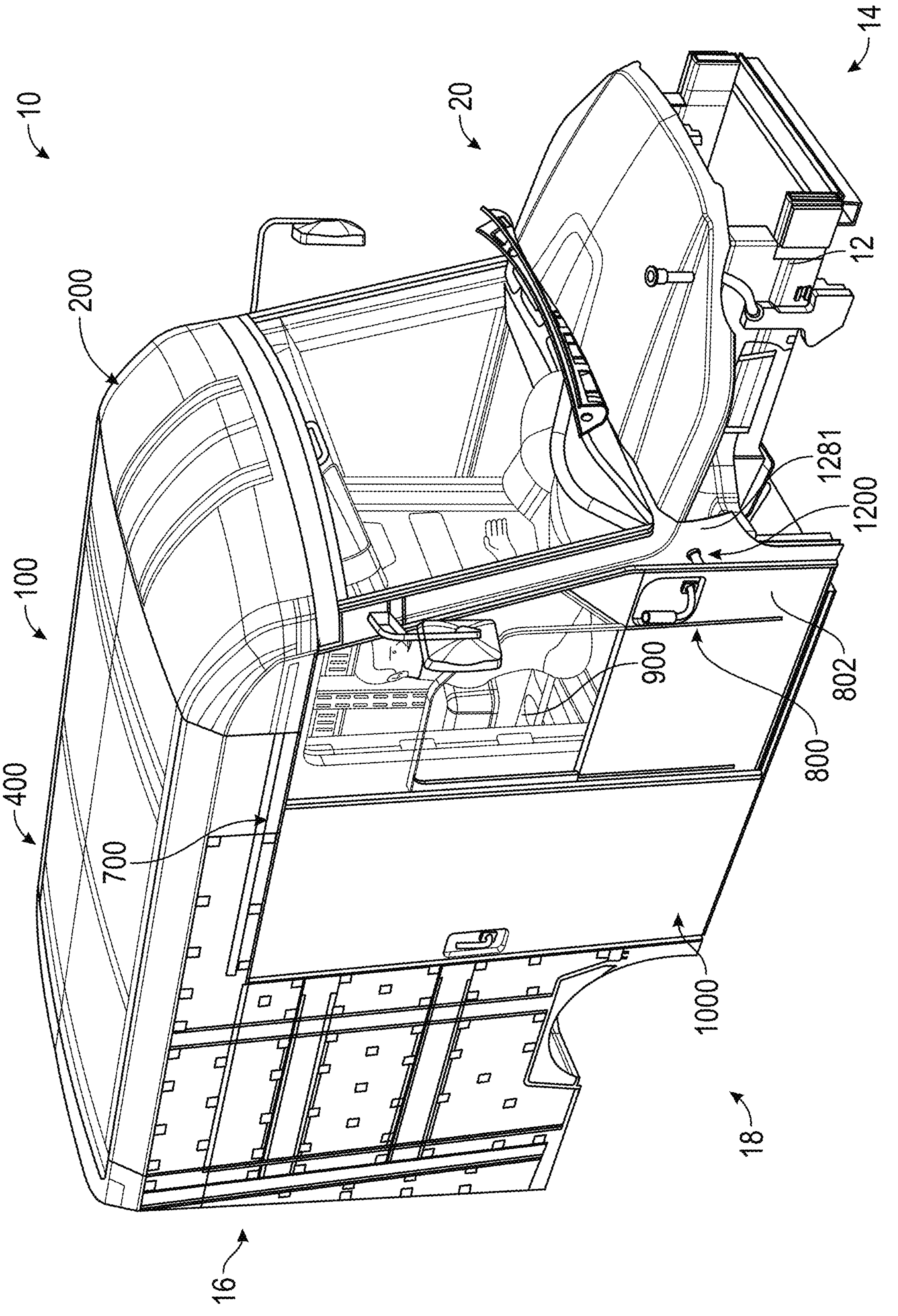
FIG. 7 is a right side perspective view of the delivery vehicle of FIG. 6 having the side door assembly, according to an exemplary embodiment.

As shown in FIG. 7, the side door assembly 700 includes a first door, shown driver cab door 800, a second door, shown as side cargo door 1000, and a locking assembly, shown as door locking assembly 1200. The driver cab door 800 extends over the right cab opening 204 and is selectively openable to access the driver compartment 202. According to an exemplary embodiment, the driver cab door 800 translates or slides rearward along the right side 18 of the body 100 from a closed position to an open position (e.g., such that the driver cab door 800 at least partially overlaps with the side cargo door 1000, extends past the B-pillar 114, etc.). In other embodiments, the driver cab door 800 is hingedly coupled to the body 100 (e.g., the A-pillar 112, etc.) and pivots between a closed position and an open position. As shown in FIG. 7, the driver cab door 800 includes a panel, shown as door panel 802, and a window assembly, shown as window assembly 900, disposed within the door panel 802. According to an exemplary, the delivery vehicle 10 includes a second cab door or passenger cab door positioned on the left side 20 of the cab 200 that extends over the left cab opening 206 and is selectively openable to access the driver compartment 202. The passenger cab door can similarly slide or pivot between an open position and a closed positioned to facilitate ingress into and egress from the cab 200 from the left side 20 of the delivery vehicle 10. According to an exemplary embodiment, the passenger cab door similarly includes a window disposed therein.

As shown in FIG. 7, the side cargo door 1000 extends over the side cargo opening 404 and is selectively openable to access the cargo compartment 402. According to an exemplary embodiment, the side cargo door 1000 translates or slides forward along the right side 18 of the body 100 from a closed position to an open position (e.g., such that the side cargo door 1000 at least partially overlaps with the driver cab door 800, toward the A-pillar 112, etc.). In another embodiment, the side cargo door 1000 translates or slides rearward along the right side 18 of the body 100 from a closed position to an open position (e.g., away from the right cab opening 204, toward the C-pillar 116, etc.). In other embodiments, the side cargo door 1000 is hingedly coupled to the body 100 (e.g., the B-pillar 114, etc.) and pivots between a closed position and an open position. According to an exemplary embodiment, the delivery vehicle 10 includes a rear door assembly that includes a rear cargo door. The rear cargo door extends over the rear cargo opening 406 and is selectively openable to access the cargo compartment 402.

Electric Delivery Vehicle

Overview

Figure 8:
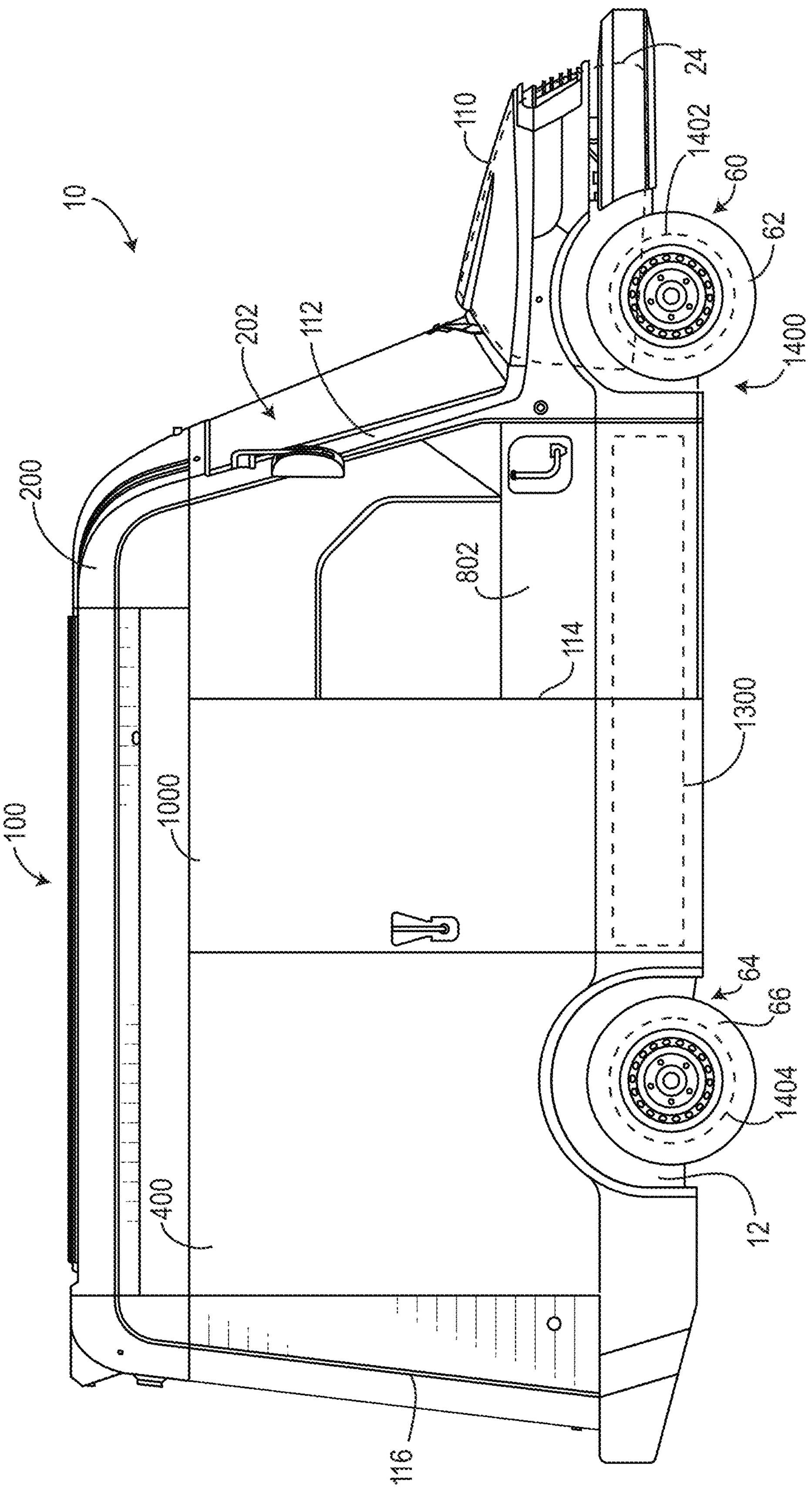
FIG. 8 is a side view of the delivery vehicle of FIG. 1 provided as an electric vehicle, according to an exemplary embodiment.
Figure 9:
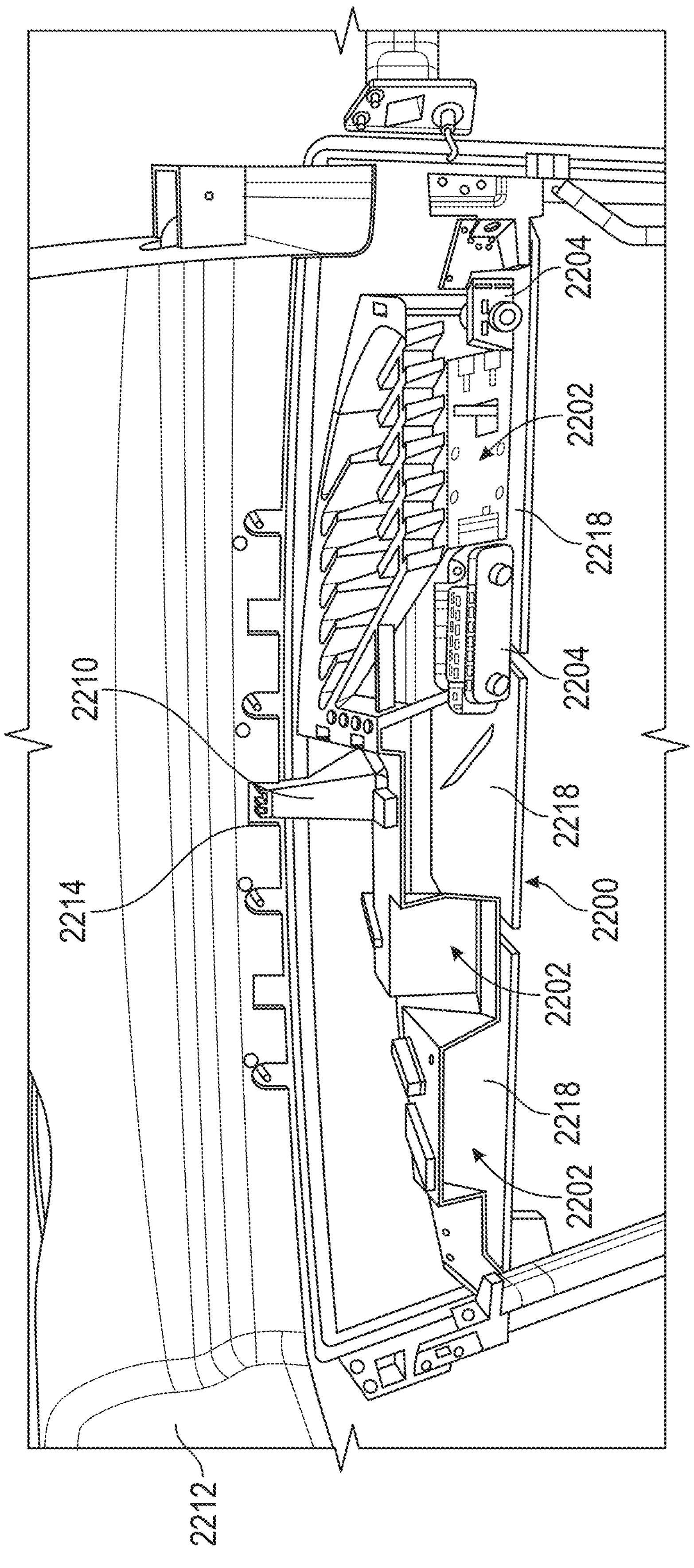
FIG. 9 is a partial rear view of the delivery vehicle of FIG. 1 having a modular headliner, according to an exemplary embodiment.

Referring to FIG. 8, the delivery vehicle 10 may be configured as a fully electric vehicle that uses electrical energy in order to transport (e.g., to drive the front wheels 62 and the rear wheels 66), according to an exemplary embodiment. The delivery vehicle 10 may include an electrical drivetrain 1400 (e.g., an electrically powered chassis, an electrically powered drive system, etc.) that includes a front electrified-axle ("E-axle") 1402 (e.g., a front electrical motor, an electrical transducer that consumes electrical energy and generates mechanical energy) and a rear E-axle 1404. The electrical drivetrain 1400 also includes an electrical energy storage system ("ESS") 1300 that includes multiple battery cells, electrical storage devices, battery packs, batteries, etc. The ESS 1300 may be positioned beneath a floor of the delivery vehicle 10 and coupled with the frame 12 of the delivery vehicle 10. The ESS 1300 is configured to store electrical energy and provide electrical energy to the front E-axle 1402 and the rear E-axle 1404 (e.g., via high-voltage cables or power distribution system including an inverter) such that the front E-axle 1402 and the rear E-axle 1404 drive the front wheels 62 and the rear wheels 66, respectively, to transport the delivery vehicle 10. The front E-axle 1402 and the rear E-axle 1404 may be coupled with the frame 12 and provide support for the delivery vehicle 10. In some embodiments, the front E-axle 1402 is positioned at least partially within the hood compartment 24. Since the delivery vehicle 10 is powered using electric motors (e.g., the front E-axle 1402 and the rear E-axle 1404), the hood compartment 24 is not occupied by the engine 72, and provides space for one or more electrical components of the electrical drivetrain 1400 such as power distribution devices (e.g., inverters, wire routing, a thermal management system, a charging system, etc.), and/or the front E-axle 1402.

Modular Headliner

According to an exemplary embodiment shown in FIGS. 9-13, the delivery vehicle 10 may include a headliner, shown as modular headliner 2200. The modular headliner 2200 may facilitate modular installation of the modular headliner 2200 and associated electronics. The modular headliner 2200 may be a single (e.g., unitary) injection molded structure that supports other components of the delivery vehicle 10. The components may be coupled with or mounted on the modular headliner 2200 prior to the modular headliner 2200 being installed in the delivery vehicle 10. By way of example, the components may be coupled with or mounted on the modular headliner 2200 off of (e.g., without being assemble on) the delivery vehicle 10. The modular headliner 2200 may eliminate the need to run wires or install other components above a user's head during assembly.

The modular headliner 2200 includes at least one compartment 2202. The compartment 2202 may be any type of compartment configured to receive or house a component associated with the delivery vehicle 10. For example, the compartment 2202 may be a pocket, an opening, a recess, a basin, or any other form of compartment. In some embodiments, the component is an electrical component 2204. The compartment 2202 may be any shape or size to receive the electrical component 2204. The electrical component 2204 may be any electrical device, system, or element associated with the delivery vehicle 10. For example, the electrical component 2204 may be a fan, camera, display, radio, speaker, transmitter, receiver, or microphone, among others. In some embodiments, the compartment 2202 is an HVAC compartment. For example, the modular headliner 2200 may receive or define at least a portion of an HVAC system of the delivery vehicle 10. The portion of the HVAC system, shown as HVAC component 2206, may be, for example, a fan, duct, or vent. The compartment 2202 may be any shape or size to receive or define the HVAC component 2206. In some embodiments, the component may be a user component. For example, a user of the delivery vehicle 10 may have a user component to store in the modular headliner 2200. The user component may be, for example, a manual, stickers, writing utensils, among others. The compartment 2202 may act as a folder or other storage compartment to temporarily hold the user component. The compartment 2202 may be easily accessible such that the user may access the compartment 2202 to easily deposit and withdraw the user component from the compartment 2202.

Figure 10:
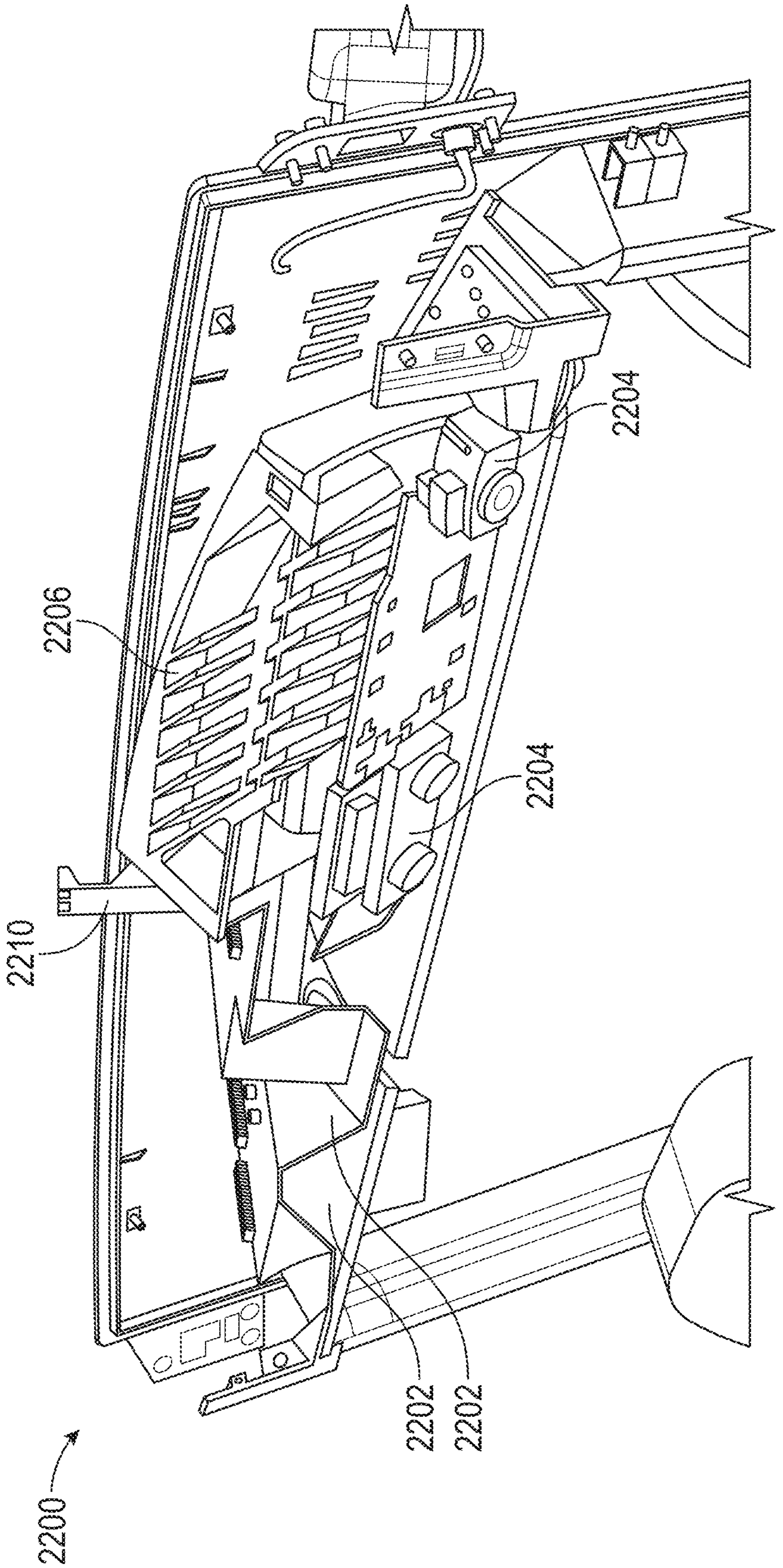
FIG. 10 is a partial rear, perspective view of the delivery vehicle of FIG. 1 having a modular headliner, according to an exemplary embodiment.
Figure 11:
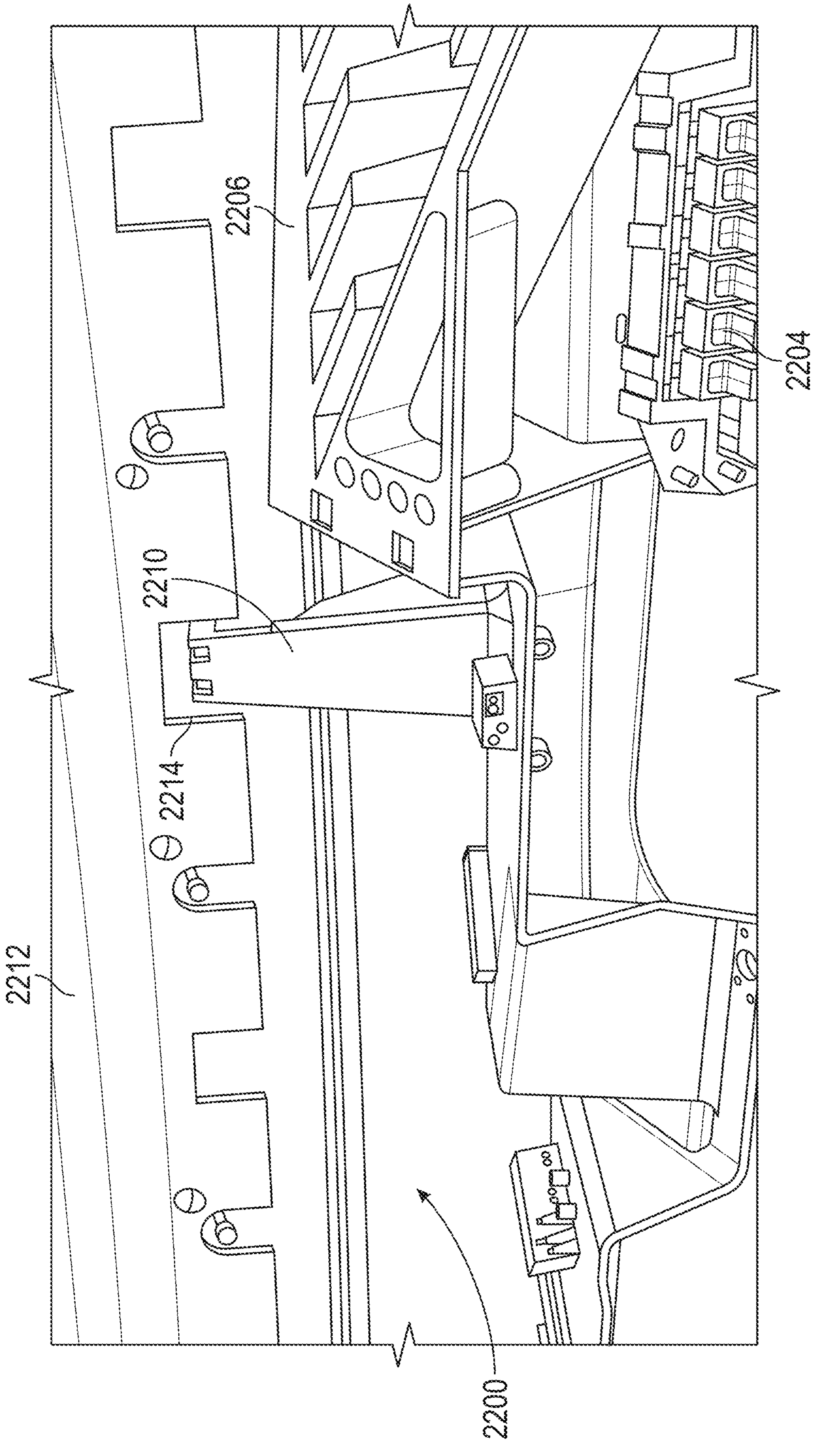
FIG. 11 is a partial view of the modular headliner of FIG. 10, according to an exemplary embodiment.

As shown in FIG. 10, in some embodiments, the modular headliner 2200 has a plurality of compartments 2202 to receive a plurality of components (e.g., the electrical component 2204, the HVAC component 2206, the user component, etc.). The plurality of compartments 2202 may receive a plurality of electrical components 2204, a plurality of HVAC components 2206, a plurality of user components, or a combination thereof. The components (e.g., the electrical component 2204, the HVAC component 2206) may be coupled with or mounted onto the modular headliner 2200 without additional fasteners (e.g., bolts, screws, nails, rivets, etc.). For example, the components may be snapped into the compartments 2202 (e.g., using a fastener-less connection, without the use of fasteners, etc.). The components may also be snapped out of the compartments 2202 to repair or replace the components. The plurality of components (e.g., the electrical component 2204, the HVAC component 2206) may be coupled with or mounted on (e.g., snapped in) the modular headliner 2200 prior to the modular headliner 2200 being installed in the delivery vehicle 10. As such, each of the components (e.g., the electrical component 2204 and the HVAC component 2206) may be assembled on the modular headliner 2200 (e.g., the modular headliner 2200 being fully pre-assembled) such that the components and the modular headliner 2200 are installed in the delivery vehicle 10 as a single module. In some embodiments, one or more of the components are assembled on the modular headliner 2200 off of the delivery vehicle 10 and one or more of the components are assembled on the modular headliner 2200 after the modular headliner 2200 (e.g., with the pre-installed components assembled thereon) is installed in the delivery vehicle 10. By way of example, the electrical component 2204 may be assembled on the modular headliner 2200 prior to the modular headliner 2200 being installed in the delivery vehicle 10, and the HVAC component 2206 may be assembled on the modular headliner 2200 after the modular headliner 2200 is installed in the delivery vehicle 10. By way of another example, the electrical component 2204, the HVAC component 2206, and one or more other components (e.g., the panel 2216, the visor 2218, etc.) are assembled on the modular headliner 2200 off of the delivery vehicle 10 prior to the modular headliner 2200 being installed in the delivery vehicle 10.

Figure 12:
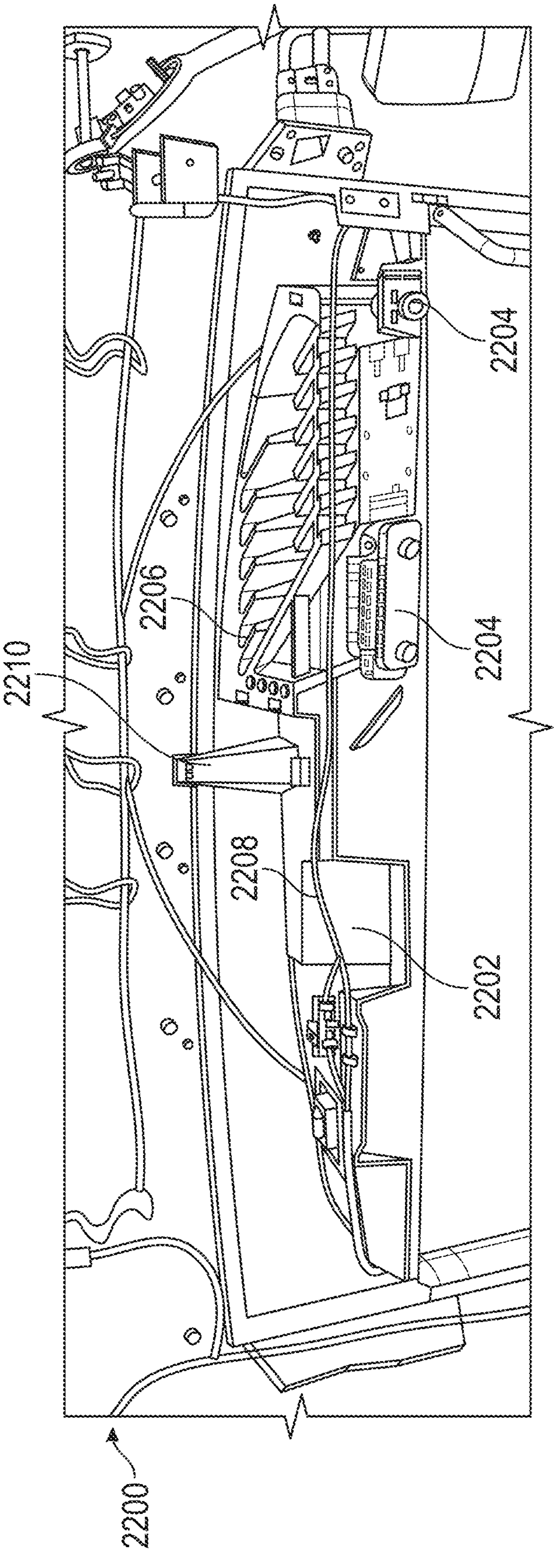
FIG. 12 is a rear view of the modular headliner of FIG. 10, according to an exemplary embodiment.

As shown in FIG. 12, the modular headliner 2200 is configured to electrically couple with the electrical components 2204. For example, the modular headliner 2200 includes a wiring system 2208. The wiring system 2208 may include wires that electrically couple with each electrical component 2204. For example, each compartment 2202 configured to receive an electrical component 2204 may have a compartment connector or terminal (e.g., a connector or terminal of the wiring system 2208) to electrically couple the electrical component 2204 with the wiring system 2208 of the modular headliner 2200. The electrical component 2204 may be disposed in the compartment 2202 such that a component connector or terminal interfaces or couples with the electrical component 2204.

The modular headliner 2200 may be configured to electrically couple the electrical components 2204 with the rest of the delivery vehicle 10. For example, the wiring system 2208 may couple the electrical components 2204 with the rest of the delivery vehicle 10. In some embodiments, the modular headliner 2200 includes a single module connector or terminal. The wiring system 2208 may electrically couple the electrical components 2204 with the module connector or terminal. The module connector or terminal may electrically couple the electrical components 2204 with other components associated with the delivery vehicle 10 (e.g., controls for driving the delivery vehicle 10, controls for operating the systems of the delivery vehicle, etc.). By way of example, the other components associated with the delivery vehicle 10 may include a user interface, a touchscreen, a display, a steering wheel, an accelerator pedal, a brake pedal, control levers, buttons, switches, or the like. In some embodiments, the modular headliner 2200 includes a plurality of module connectors or terminals.

As shown in FIGS. 9-12, the modular headliner 2200 includes at least one member, shown as hook 2210. The hook 2210 is configured to selectively couple the modular headliner 2200 with the cab 200 of the delivery vehicle 10. The modular headliner 2200 may be disposed in the driver compartment 202 of the cab 200 of the delivery vehicle 10. The hook 2210 may be configured to support the modular headliner 2200 in the driver compartment 202. The hook 2210 may be further configured to guide the modular headliner 2200 into proper alignment and positioning when installed in the driver compartment 202. By way of example, the hook 2210 may engage with an engagement feature (e.g., engagement feature 2214) positioned within the driver compartment 202 to align (e.g., vertically align, laterally align, longitudinally align) the modular headliner 2200 within the driver compartment 202. In some embodiments, the hook 2210 supports and self-locates the modular headliner 2200 prior to the modular headliner 2200 being bolted in place. The hook 2210 may be disposed proximate a center of the modular headliner 2200. The hook 2210 may couple the modular headliner 2200 with the cab 200 of the delivery vehicle 10. In some embodiments, the hook 2210 couples the modular headliner 2200 with a top portion, shown as roof 2212, of the cab 200. For example, the roof 2212 may include an engagement feature 2214 configured to interface with the hook 2210. For example, the engagement feature 2214 may be a bar. The hook 2210 may couple the modular headliner 2200 with the bar (e.g., hook on to the bar). The hook 2210 can support the modular headliner 2200 and any number of components (e.g., the electrical component 2204, the HVAC component 2206) mounted on the modular headliner 2200. The hook 2210 may position the modular headliner 2200 at a particular vertical position or height within the driver compartment 202 of the cab 200.

In some embodiments, the hook 2210 may provide some tolerance or flexibility regarding a horizontal or lateral position of the modular headliner 2200. For example, the hook 2210 may couple with an engagement feature 2214 that is a bar having a substantially horizontal orientation (e.g., the bar extends in a lateral direction between the right side 18 and the left side 20 of the delivery vehicle 10). In such an example, the hook 2210 may be configured to slide horizontally (e.g., laterally) along the bar to position the modular headliner 2200 at a desired lateral position. By way of another example, the delivery vehicle 10 (e.g., the roof 2212) may include a plurality of engagement features 2214 laterally spaced apart from each other (e.g., such that each engagement feature 2214 is isolated from another engagement feature 2214). In such an example, the hook 2210 may be configured to engage with any one of the plurality of engagement features 2214 to facilitate positioning the modular headliner 2200 at a desired lateral position. In some embodiments, the modular headliner 2200 includes two or more hooks 2210 configured to engage with two or more engagement features 2214 to support and self-locate the modular headliner 2200 within the driver compartment 202 of the cab 200.

Figure 13:
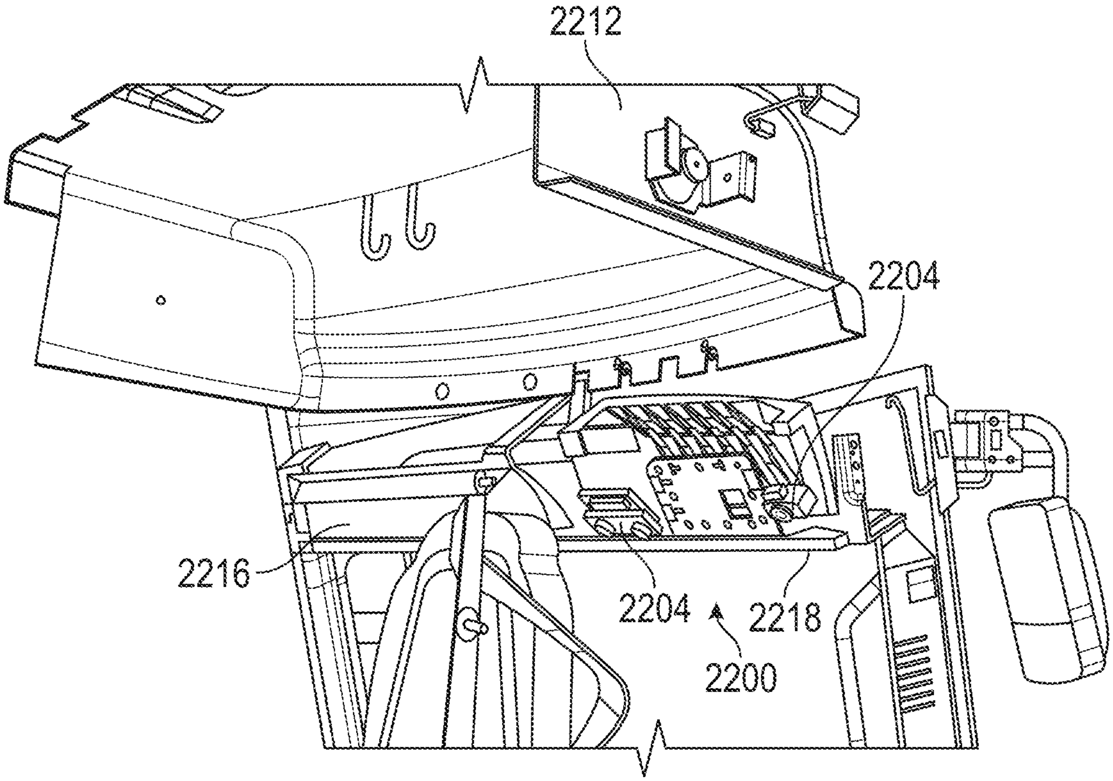
FIG. 13 is a partial rear, perspective view of the delivery vehicle of FIG. 1 having a modular headliner, according to an exemplary embodiment.

In some embodiments, with the hook 2210 holding the modular headliner 2200 at a desired position, the modular headliner 2200 is further coupled with the cab 200 using another mechanism. For example, the modular headliner 2200 may be bolted inside the driver compartment 202 of the cab 200 using one or more fasteners. Other components of the delivery vehicle 10 may be coupled with the modular headliner 2200. For example, as shown in FIG. 13, the delivery vehicle 10 may have at least one panel 2216. The panel 2216 may be configured to cover at least a portion of the modular headliner 2200 to enclose the one or more components (e.g., the electrical component 2204, the HVAC component 2206) stored within the one or more compartments 2202. The panel 2216 may be coupled with and cover the modular headliner 2200 such that, when the panel 2216 is installed, the components stored within the components are out of sight of the operator. In some embodiments, the panel 2216 may snap onto the modular headliner 2200 using a fastener-less connection (e.g., without requiring a fastener). In some embodiments, a plurality of panels 2216 couple with the modular headliner 2200. In some embodiments, the panel 2216 is coupled with the modular headliner 2200 prior to the modular headliner 2200 being installed in the delivery vehicle 10.

As shown in FIG. 13, in some embodiments, the modular headliner 2200 includes a visor 2218. The visor 2218 may movable between a stored position and a deployed position. In the deployed position, the visor 2218 can help prevent light from shining directly into a user's eyes. In some embodiments, the modular headliner 2200 includes a plurality of visors 2218. In some embodiments, the modular headliner 2200 includes at least three visors 2218. In some embodiments, the visor 2218 is coupled with the modular headliner 2200 prior to the modular headliner 2200 being installed in the delivery vehicle 10.

Figure 14:
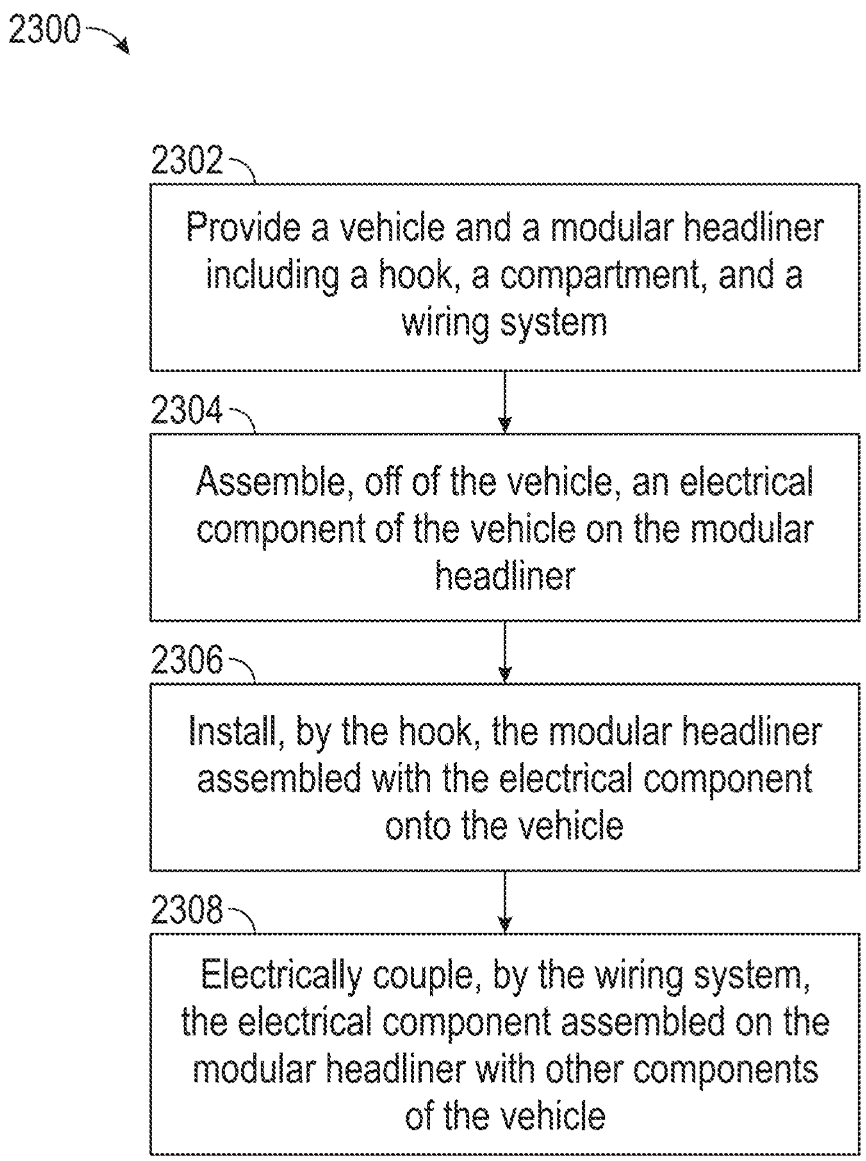
FIG. 14 is a method for assembling a modular headliner and installing the assembled modular headliner onto a vehicle, according to an exemplary embodiment.

Referring to FIG. 14, a method 2300 for installing a modular headliner (e.g., the modular headliner 2200) on a vehicle (e.g., the delivery vehicle 10) is shown, according to some embodiments. The method 2300 includes steps 2302-2308. At step 2302, the vehicle and the modular headliner are provided. The modular headliner includes a hook (e.g., hook 2210), a compartment (e.g., compartment 2202), and a wiring system (e.g., wiring system 2208).

At step 2304, a component of the vehicle is assembled on the modular headliner off of the vehicle. The component may include an electrical component (e.g., electrical component 2204), an HVAC component (e.g., HVAC component 2206), and/or one or more other components of the vehicle. The component is assembled on the modular headliner off of the vehicle such that the modular headliner is pre-assembled (e.g., with the component assembled thereon) prior to the modular headliner being installed on the vehicle.

At step 2306, the modular headliner assembled with the component (e.g., the pre-assembled modular headliner) is installed onto the vehicle by the hook of the modular headliner. In some embodiments, when installed onto the vehicle by the hook, the modular headliner is configured to be disposed in a driver comportment defined by a cab of the vehicle. In some embodiments, the hook is configured to engage with an engagement feature of the vehicle to selectively couple the modular headliner with the vehicle. In some embodiments, the engagement feature is positioned such that the hook is configured to guide the modular headliner into proper positioning and alignment and support the modular headliner prior to the modular headliner being bolted in place.

At step 2308, the wiring system electrically couples the component assembled on the modular headliner with other components of the vehicle. By way of example, the compartment of the modular headliner may be configured to receive the component and may have a compartment connector or terminal (e.g., a connector or terminal of the wiring system) to electrically couple the component with the wiring system of the modular headliner.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the delivery vehicle 10 and the systems and components thereof as shown in the various exemplary embodiments is illustrative only. Additionally, any element disclosed in one embodiment may be incorporated or utilized with any other embodiment disclosed herein.

The invention claimed is:

1. An electric delivery vehicle comprising:

a cab defining a driver compartment; and a modular headliner configured to be disposed in the driver compartment to house an electrical component of the electric delivery vehicle, the modular headliner including:

a hook configured to couple the modular headliner with the cab;

a compartment configured to receive the electrical component; and a wiring system configured to electrically couple the electrical component with other components of the electric delivery vehicle;

wherein the modular headliner is a self-contained assembly, and the electrical component is configured to be assembled on the modular headliner without the modular headliner coupled with the cab by the hook.

2. The electric delivery vehicle of claim 1, wherein the hook is configured to selectively couple the modular headliner with the cab.

3. The electric delivery vehicle of claim 2, wherein the cab includes a roof including at least one engagement feature, and wherein the hook is configured to engage with an engagement feature of the at least one engagement feature to selectively couple the modular headliner with the roof of the cab.

4. The electric delivery vehicle of claim 3, wherein the engagement feature is positioned such that the hook is configured to guide the modular headliner into proper positioning and alignment and support the modular headliner prior to the modular headliner being bolted in place.

5. The electric delivery vehicle of claim 4, wherein the hook is disposed proximate a center of the modular headliner, wherein the hook is configured to hold the modular headliner at a vertical position, and wherein the at least one engagement feature provides adjustment of a horizontal position of the modular headliner.

6. The electric delivery vehicle of claim 1, wherein the modular headliner is a unitary injection molded structure.

7. The electric delivery vehicle of claim 1, wherein the modular headliner defines at least a portion of an HVAC system.

8. The electric delivery vehicle of claim 1, wherein the electrical component is at least one of a fan, camera, display, radio, speaker, transmitter, receiver, or microphone.

9. The electric delivery vehicle of claim 8, wherein the modular headliner includes:

a plurality of compartments configured to receive a plurality of electrical components; and a terminal, wherein the wiring system is configured to electrically couple the plurality of electrical components with the terminal.

10. The electric delivery vehicle of claim 9, wherein the terminal is configured to electrically couple the plurality of electrical components with the other components of the electric delivery vehicle.

11. The electric delivery vehicle of claim 10, wherein the plurality of electrical components are configured to snap into the plurality of compartments of the modular headliner without requiring a fastener and without the modular headliner being installed in the electric delivery vehicle.

12. The electric delivery vehicle of claim 9, wherein the modular headliner includes a panel configured to cover at least a portion of the modular headliner such that the plurality of electrical components received within the plurality of compartments are disposed within the plurality of compartments.

13. The electric delivery vehicle of claim 12, wherein the panel is configured to snap onto the modular headliner without requiring a fastener and without the modular headliner to be installed in the electric delivery vehicle.

14. The electric delivery vehicle of claim 1, wherein the modular headliner includes a visor movable between a stored position and a deployed position.

15. A modular headliner for an electric delivery vehicle including an electrical component and a cab defining a driver compartment, the modular headliner including:

a hook configured to selectively couple the modular headliner with the cab;

a compartment configured to receive the electrical component; and a wiring system configured to electrically couple the electrical component with other components of the electric delivery vehicle, wherein the cab includes a roof including at least one engagement feature, wherein the hook is configured to engage with an engagement feature of the at least one engagement feature to selectively couple the modular headliner with the roof of the cab within the driver compartment, and wherein the hook is configured to hold the modular headliner at a vertical position and facilitate lateral adjustment of the modular headliner within the driver compartment.

16. The modular headliner of claim 15, further comprising:

a plurality of compartments configured to receive a plurality of electrical components; and a terminal, wherein the wiring system is configured to electrically couple the plurality of electrical components with the terminal, and wherein the plurality of electrical components include at least one of a fan, camera, display, radio, speaker, transmitter, receiver, or microphone.

17. The modular headliner of claim 16, wherein the plurality of compartments are configured to receive the plurality of electrical components without requiring a fastener without the modular headliner being installed in the electric delivery vehicle.

18. The modular headliner of claim 17, further comprising a panel configured to cover at least a portion of the modular headliner such that the plurality of electrical components received within the plurality of compartments are enclosed therein.

19. The modular headliner of claim 18, wherein the panel is configured to snap onto the modular headliner without a fastener and without requiring the modular headliner to be installed in the electric delivery vehicle.

20. A method of assembly comprising:

providing a vehicle and a modular headliner, the modular headliner including a hook, a compartment, and a wiring system;

assembling, off of the vehicle, an electrical component of the vehicle on the modular headliner;

installing, by the hook, the modular headliner assembled with the electrical component onto the vehicle; and electrically coupling, by the wiring system, the electrical component assembled on the modular headliner with other components of the vehicle;

wherein the compartment is configured to receive the electrical component of the vehicle when assembled on the modular headliner; and wherein the modular headliner, when installed onto the vehicle, is configured to be disposed in a driver compportment defined by a cab of the vehicle.

* * * * *